United States Patent
Kim et al.

(10) Patent No.: US 11,628,693 B2
(45) Date of Patent: Apr. 18, 2023

(54) PNEUMATIC TIRE COMPRISING RESONANCE NOISE REDUCTION STRUCTURE

(71) Applicant: HANKOOK TIRE & TECHNOLOGY CO., LTD., Seoul (KR)

(72) Inventors: Sungkyu Kim, Daejeon (KR); Yoonjeong Jang, Daejeon (KR); Manseop Kim, Daejeon (KR); Changhyo Hong, Daejeon (KR)

(73) Assignee: HANKOOK TIRE & TECHNOLOGY CO., LTD.

( * ) Notice: Subject to any disclaimer, the term of this patent is extended or adjusted under 35 U.S.C. 154(b) by 686 days.

(21) Appl. No.: 16/578,248

(22) Filed: Sep. 20, 2019

(65) Prior Publication Data

US 2020/0324584 A1  Oct. 15, 2020

(30) Foreign Application Priority Data

Apr. 12, 2019 (KR) .................. 10-2019-0043230

(51) Int. Cl.
 B60C 19/00 (2006.01)
 G10K 11/162 (2006.01)

(52) U.S. Cl.
 CPC .......... B60C 19/002 (2013.01); G10K 11/162 (2013.01)

(58) Field of Classification Search
 CPC ......... B60C 19/002; B60C 17/06; B60C 5/00; G10K 11/162; F01N 1/10; B29D 30/00
 See application file for complete search history.

(56) References Cited

U.S. PATENT DOCUMENTS

| | | | |
|---|---|---|---|
| 2,297,530 A | 9/1942 | George | |
| 8,430,143 B2 | 4/2013 | Tanno | |
| 9,517,661 B2 | 12/2016 | Joo et al. | |
| 10,618,359 B2* | 4/2020 | Tyburski | B60C 19/122 |
| 2008/0099116 A1* | 5/2008 | Tanno | B60C 19/002 |
| | | | 152/454 |
| 2013/0048180 A1 | 2/2013 | Song | |
| 2016/0031269 A1* | 2/2016 | Sakakibara | B60C 19/002 |
| | | | 152/450 |
| 2017/0326923 A1 | 11/2017 | Sakakibara | |
| 2019/0232732 A1* | 8/2019 | Kirby | B60C 5/002 |

FOREIGN PATENT DOCUMENTS

| | | | | |
|---|---|---|---|---|
| CN | 204877601 | * | 12/2015 | ............ F01N 1/10 |
| CN | 105599548 A | | 5/2016 | |
| DE | 102016225552 A1 | | 6/2018 | |
| JP | 2004168212 A | | 6/2004 | |

(Continued)

OTHER PUBLICATIONS

Extended European Search Report for Application No. 19199286.6 dated Mar. 2, 2020.

*Primary Examiner* — Galen H Hauth
*Assistant Examiner* — Shibin Liang
(74) *Attorney, Agent, or Firm* — Renaissance IP Law Group LLP

(57) ABSTRACT

Disclosed is a pneumatic tire including a film attached to an inner liner, and a plurality of porous sound absorbing members attached to the film and arranged at a predetermined interval. According to the pneumatic tire, occurrence of resonance noise in the tire may be reduced.

5 Claims, 4 Drawing Sheets

(56) References Cited

FOREIGN PATENT DOCUMENTS

| | | | |
|---|---|---|---|
| JP | 2004306673 | A | 11/2004 |
| JP | 2006335208 | A | 12/2006 |
| JP | 2010280340 | A | 12/2010 |
| JP | 2015067051 | A | 4/2015 |
| JP | 2016094163 | A | 5/2016 |
| JP | 2017509528 | A | 4/2017 |
| JP | 2017202788 | A | 11/2017 |
| JP | 2017202790 | A | 11/2017 |
| JP | 6294184 | B2 | 3/2018 |
| JP | 2018508401 | A | 3/2018 |
| JP | 2018520928 | A | 8/2018 |
| JP | 2019031289 | A | 2/2019 |
| KR | 200266577 | Y1 | 2/2002 |
| KR | 20070029652 | A | 3/2007 |
| KR | 101535029 | B1 | 7/2015 |
| KR | 101773121 | B1 | 8/2017 |
| KR | 101781698 | B1 | 9/2017 |
| WO | 2015092497 | A1 | 6/2015 |

\* cited by examiner

PNEUMATIC TIRE COMPRISING RESONANCE NOISE REDUCTION STRUCTURE

CROSS-REFERENCE TO RELATED APPLICATION

This application claims priority to Korean Patent Application No. 10-2019-0043230, filed on Apr. 12, 2019, the disclosure of which is incorporated by reference herein in its entirety.

BACKGROUND

Technical Field

The present disclosure relates to a pneumatic tire, and more particularly to a pneumatic tire comprising a resonance noise reduction structure.

Related Art

Generally, one of the causes for the generation of tire noise is the cavity resonance noise generated by vibration of the air filling the interior of a tire. The tire cavity resonance noise is generated when the tread part of a tire touching the road surface during vehicle driving vibrates due to the unevenness of the road surface, and this vibration again vibrates the air inside the tire cavity.

The frequency of the sound perceived as noises in the cavity resonance noise may vary depending on the size of the tire; however, the frequency of the noise is generally known to be near 200 Hz to 300 Hz. Accordingly, reducing the noise level in this frequency region may be considered as a key solution for reducing the tire noises.

Furthermore, the cavity resonance noise in a tire may vary depending on the size of the cavity formed by the tire and the rim. A variety of technologies for reducing the tire resonance noise have been hitherto suggested in order to regulate the size of the cavity and to reduce the cavity resonance noise, and such technologies include attached a sound absorbing material inside the tire, and adhering a sound absorbing material on the rim surface.

Among them, the low-noise pneumatic tire according to Korean Patent Application Publication No. 10-2007-0029652 employs a system in which the noise generated in the internal cavity of a tire by adhering a sound absorbing material in the interior of the tire. However, the low-noise pneumatic tire disclosed in Korean Unexamined Patent Application No. 10-2007-0029652 has a problem that the sound absorbing material should be separately attached to the interior of the tire after tire production, and the sound absorbing material may fall off during driving due to impact or the like.

Recently, development of tires focuses on wide tires each having a wide-width tread portion and Ultra High Performance (UHP) tires each having a low aspect ratio. Yet, negative pressure occurs in these tires due to an impact from the ground and thus these tires are disadvantageous compared to normal tires when it comes to noise reduction.

In order to reduce resonance reduction of a tire, polyurethane foam is attached to a tire inner liner as a sound absorbing material. To this end, it is required to coat an entire inner surface of the inner liner with an adhesive.

In particular, in order to prevent air leakage in spite of penetration by a foreign substance such as a nail, a tire with an inner liner coated with sealant has been developed and available in markets. Yet, the sealant may be absorbed into a sound absorbing material and the role of the sealant may not be played effectively.

SUMMARY

An object of the present inventive concept is to provide a pneumatic tire capable of reducing occurrence of resonance noise inside the tire.

To achieve the object, a pneumatic tire of the present inventive concept includes a film attached to an inner liner; and a plurality of porous sound absorbing members attached to the film and arranged at a predetermined interval.

The pneumatic tire may further include a sealant layer coated on the inner liner, and the film may be attached to the sealant layer.

The plurality of porous sound absorbing members may be formed by intersecting two pipes to be integrally formed.

The plurality of porous sound absorbing members may be bonded to the film by an adhesive, and the film with the plurality of porous sound absorbing members may be attached to the sealant layer in a circumferential direction.

The plurality of porous sound absorbing members may be made of a polypropylene material.

The film may be made of a polypropylene material.

The film has a plurality of through holes attached at least at a portion where the plurality of porous sound absorbing members may be attached, and, when the plurality of porous sound absorbing members are attached, the sealant layer may be absorbed through the plurality of through holes and thereby attached to the porous sound absorbing member.

DESCRIPTION OF EXEMPLARY EMBODIMENTS

Hereinafter, an exemplary embodiment of the present inventive concept will be described in detail with reference to the accompanying drawings so that those skilled in the art can easily achieve the present inventive concept. The present inventive concept may be modified in various ways and may not be limited to the embodiments described herein.

Figure 1:
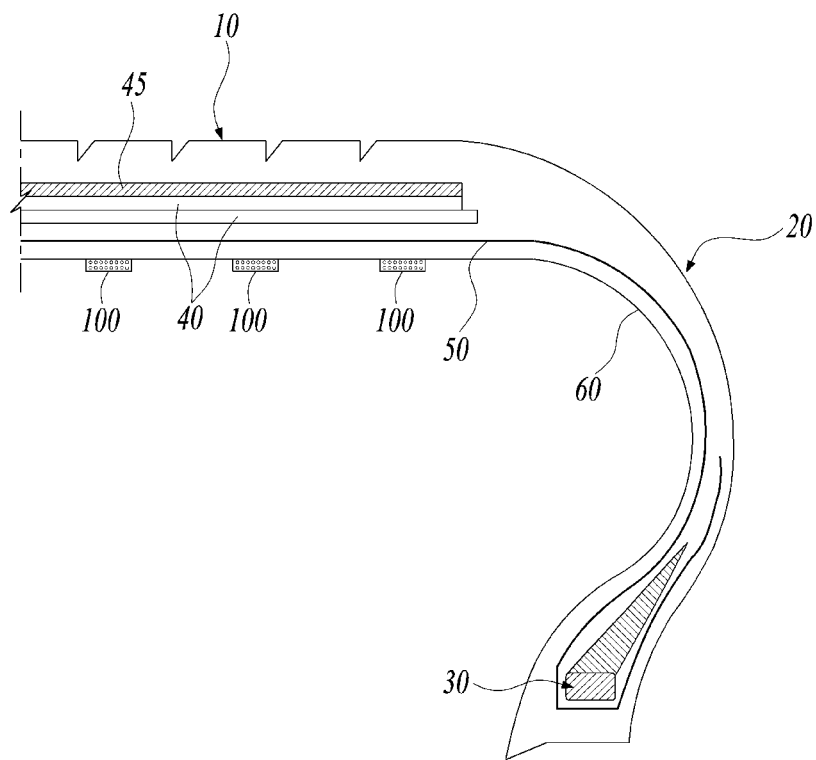
FIG. 1 is a half cross-sectional view of a pneumatic tire according to an embodiment of the present inventive concept.
Figure 2:
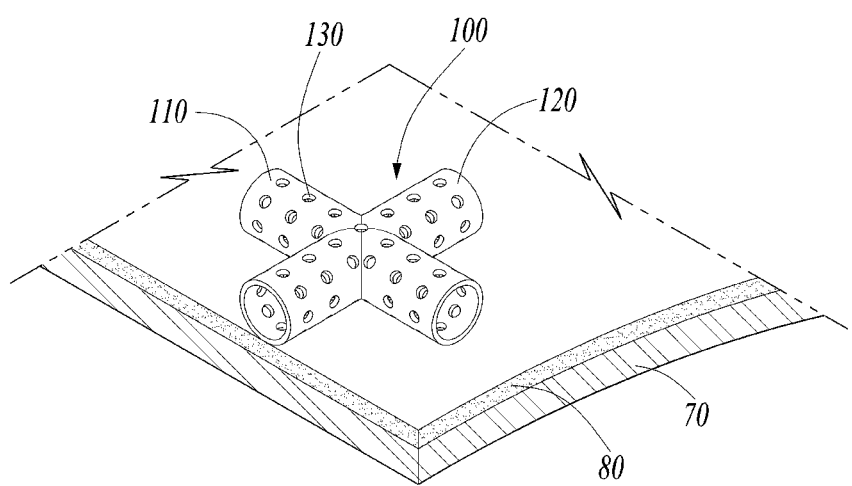
FIG. 2 is a partial perspective view of an example in which a sealant layer, a film, and a porous sound absorbing member are sequentially attached to an inner liner.
Figure 3:
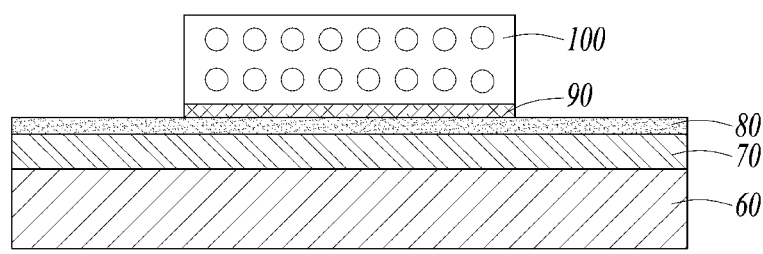
FIG. 3 is a cross-sectional view of an example in which a sealant layer, film, and a porous sound absorbing member are sequentially attached to an inner liner.
Figure 4:
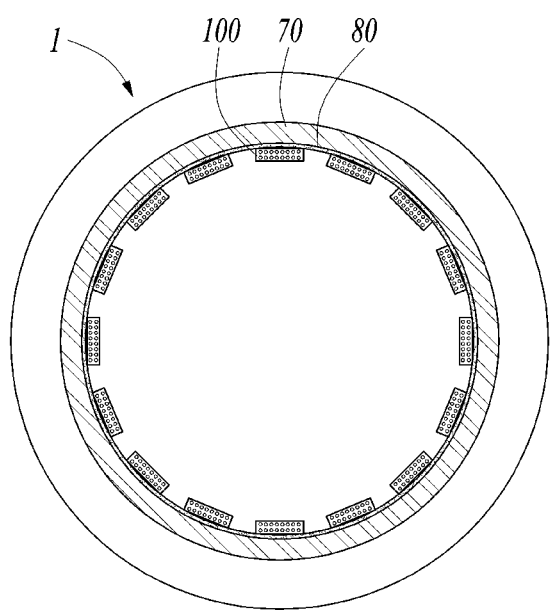
FIG. 4 is a schematic view of an example in which a sealant layer and a film are attached to an inner surface of a pneumatic tire whilst a plurality of porous sound absorbing members are arranged on the film.

FIG. 1 is a half cross-sectional view of a pneumatic tire according to an embodiment of the present inventive concept, FIG. 2 is a partial perspective view of an example in which a sealant layer, a film, and a porous sound absorbing member are sequentially attached to an inner liner, FIG. 3 is a cross sectional view of an example in which a sealant layer, film, and a porous sound absorbing member are sequentially attached to an inner liner, and FIG. 4 is a schematic view of an example in which a sealant layer and a film are attached to an inner surface of a pneumatic tire whilst a plurality of porous sound absorbing members are arranged on the film.

A pneumatic tire according to an embodiment of the present inventive concept includes a film 80 attached to an inner liner 60, and a plurality of porous sound absorbing members 100 attached to the film 80 and spaced apart at a predetermined interval.

In general, the pneumatic tire includes a tread portion 10, a side wall portion 20, and a bead portion 30.

The tread portion 10, which is a portion to be brought into contact with the ground, may transfer driving power and braking power of a vehicle to a road surface and may include a cap tread and an under tread.

The side wall portion 20 protects a carcass from an external impact and serves as a medium that transfers movement of a steering wheel to the tread portion 10 through the bead portion 30.

The bead portion 30, a portion to be mounted to a wheel, may include a bead core composed of a plurality of bead wires and a bead filter A belt 40 for improving traction and handling is disposed inside the tread portion 10. A reinforcement belt 45 for reinforcing strength of a belt layer may be provided on a upper layer of the belt 40. In addition, a configuration for preventing separation between steel belt layers, such as a reinforcement capply and a belt cushion, may be included on an upper layer of the reinforcement belt 45.

A carcass 50 forming an internal structure of the tire is disposed below the belt 40. The carcass 50 may be disposed from the tread portion 10 through the side wall portion 20 to the bead portion 30. In particular, the carcass 50 includes a portion surrounding the bead core and then raised to a predetermined height, that is, a turn-up portion.

The inner liner 60 forming an inner surface of the tire is provided on an inner surface of the carcass 50 and maintains an air pressure inside the tire.

The film 80 with the plurality of porous sound absorbing members 100 arranged thereon may be attached to the inner surface of the inner liner 60.

If the plurality of porous sound absorbing members 100 are attached to the film 80 and then the film 80 is attached to the inner surface of the inner liner 60, attachment processes can be done all at once and thus workability can improve further.

The pneumatic tire according to an embodiment of the present inventive concept further includes the sealant layer 70 coated on the inner liner 60, and the film 80 may be attached to the sealant 70.

Since the sealant layer 70 is coated on the inner surface of the inner liner 60, even though a hole is formed as a foreign matter such as a sharp nail, a screw, etc. penetrates the pneumatic tire, the sealant layer 70 may fill the hole due to internal pressure so that air leakage can be prevented.

The film 80 may be attached to the sealant layer 70 in a circumferential direction. By protecting the sealant layer 70 and reducing an area to contact air, the film 80 may enable the sealant layer 70 to perform a function of preventing air leakage.

The plurality of porous sound absorbing members 100 may be formed such that two pipes are formed integrally to interest each other, as shown in FIG. 2. Specifically, a circular first pipe 110 and a circular second pipe 120 may intersect each other in a cross shape to be formed integrally. A plurality of through holes 130 is formed on a circumference of the first pipe 110 and the second pipe 120.

The first pipe 110 and the second pipe 120 may be formed not as a circular pipe, but as a rectangular pipe. The plurality of through holes 130 may be formed not just in a circular shape, but also in an elliptical or polygonal shape.

Since the plurality of porous sound absorbing members 100 are in a structure where a passage exists and a plurality of pores is formed on a surface, resonance noise in the tire may be reduced effectively.

The plurality of porous sound absorbing members 100 may be bonded to the film 80 by an adhesive 90. That is, after the plurality of porous sound absorbing members 100 are bonded to the film 80 by the adhesive 90, the film 80 with the plurality of porous sound absorbing members 100 bonded thereto may be attached to the sealant 80 in a circumferential direction.

As such, after the plurality of porous sound absorbing members 100 are first arranged on and bonded to the film 80 and then, the film 80 is attached to an inner surface of the sealant layer 70, attachment processes can be done all at once and thus workability may improve further.

The plurality of porous sound absorbing members 100 is preferably made of a light material such as polypropylene.

Polypropylene is more transparent and harder than a polyethylene film. As density of polypropylene is 0.92, which is the lowest density among the currently available plastic materials, and has a relatively high melting temperature of 160° C.

If the plurality of porous sound absorbing members 100 are made of a light material such as polypropylene, it may not affect the entire weight of the tire substantially.

In addition, the film 80 may be also made of a light material such as polypropylene.

While a vehicle travels, a tire undergoes up-and-down motions, and the plurality of porous sound absorbing members 100 may be arranged at a proper interval, thereby achieving a light weight and substantially not affecting the sealant layer.

As such, if the film and the porous sound absorbing members are used, a process of coating the film with adhesive and coupling sound absorbing materials may be performed beforehand, and thus, the adhesive can be evenly coated and workability may improve.

Figure 5:
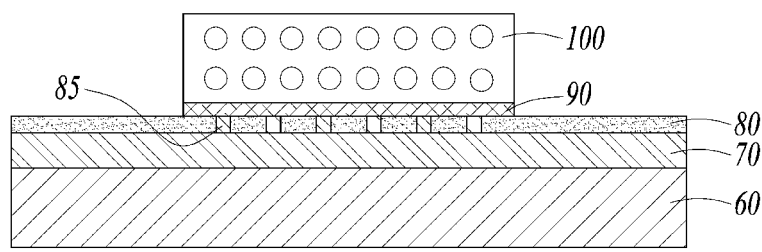
FIG. 5 is a cross-sectional view of an example in which a sealant layer, a film, and a porous sound absorbing member are attached to an inner liner in a pneumatic tire according to another embodiment of the present inventive concept.

FIG. 5 is a cross-sectional view of an example in which a sealant layer, a film, and a porous sound absorbing member are attached to an inner liner in a pneumatic tire according to another embodiment of the present inventive concept.

In the pneumatic tire according to the present inventive concept, a plurality of through holes 85 may be attached at least at a portion of the film 80 where a porous sound absorbing member 100 is attached. The plurality of through holes 85 may be formed on the entire inner surface of the film 80, but it is preferable that the plurality of through holes 85 is formed on an area of the film 80 to which a porous sound absorbing member 100 is attached.

Accordingly, when the plurality of porous sound absorbing members 100 are attached, the sealant layer 70 is absorbed through the plurality of through holes 85 and thus attached to a corresponding porous sound absorbing member 100. Accordingly, the sealant layer 70 may improve attachment performance of the corresponding sound absorbing member 100.

Figure 6:
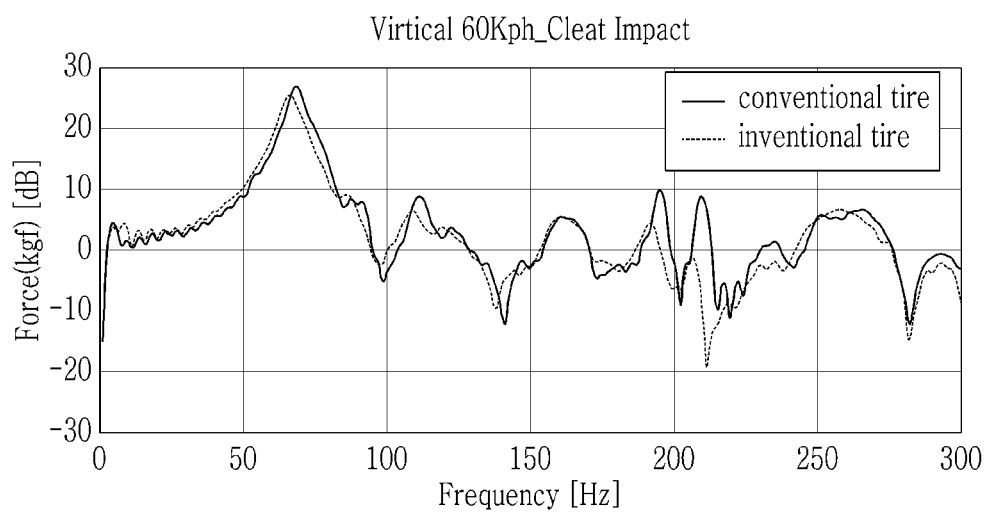
FIGS. 6 and 7 are graphs illustrating measurements of resonance sound between a pneumatic tire and a conventional tire according to an embodiment of the present inventive concept.
Figure 7:
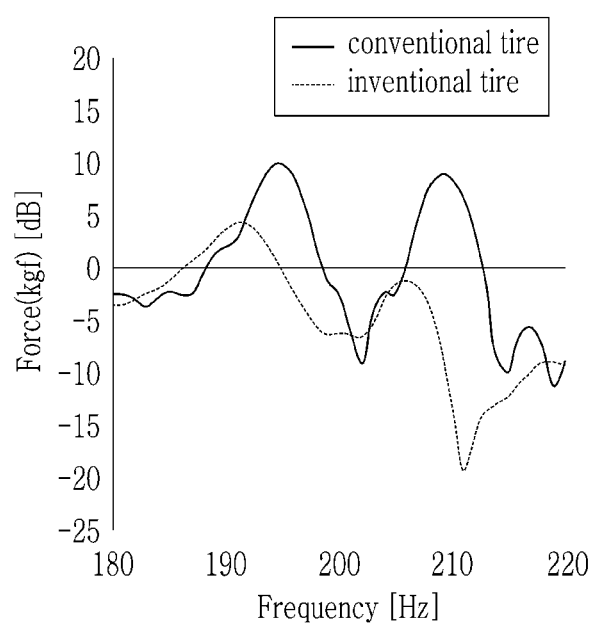

FIGS. 6 and 7 are graphs illustrating measurements of resonance sound between a pneumatic tire and a conventional tire according to an embodiment of the present inventive concept. FIG. 7 is an enlarged view of a section from 180 Hz to 220 Hz in the graph of FIG. 6.

A pneumatic tire of 225/65R17H and RH12 is texted.

To this end, Cleat Impact Test was conducted in which when a tire rolls on a test drum having protrusions, a spindle force is measured so as to measure a tire force according to a frequency. A test result on the basis of a change in force in a frequency range (180-220 Hz) where resonance sound occurs at 60 km/h may be utilized to indirectly determine whether resonance sound occurs.

Resonance sound occurring in an existing normal tire and a tire of the present inventive concept can be compared based on graphs of a force in a low frequency range of 0-300 Hz, as shown in FIG. 6.

As for a normal tire with an inner liner to which nothing is attached, two force peak is found in a range of 180-220 Hz and thus it is assumed that resonance sound would occur.

In a tire of the present inventive concept with an inner liner to which a plurality of porous sound absorbing members are attached, a force peak in the range of 180-220 Hz is reduced compared to the normal tire and thus it is expected that intensity of resonance noise would be reduced.

According to the pneumatic tire of the present inventive concept, occurrence of resonance noise in the tire may be reduced.

Although exemplary embodiments of the present inventive concept have been described for illustrative purposes, those skilled in the art will appreciate that various modifications, additions and substitutions are possible, without departing from the scope and spirit of the invention as disclosed in the accompanying claims. Therefore, the embodiment disclosed in the present inventive concept is intended to illustrate the scope of the technical idea of the present inventive concept, and the scope of the present inventive concept is not limited by the embodiment. The scope of the present inventive concept shall be construed on the basis of the accompanying claims, and it shall be construed that all of the technical ideas included within the scope equivalent to the claims belong to the present inventive concept.

According to the above-described pneumatic tire of the present inventive concept, occurrence of resonance sound inside the tire may be reduced.

What is claimed is:

1. A pneumatic tire comprising:
   a sealant layer coated on an inner liner;
   a film attached to the sealant layer; and
   a plurality of porous sound absorbing members attached to the film by an adhesive and arranged at a predetermined interval,
   wherein the plurality of porous sound absorbing members have a circular first pipe and a circular second pipe intersecting each other in a cross shape to be formed integrally,
   wherein a plurality of through holes are formed on a circumference of the first pipe and the second pipe,
   wherein the film has a plurality of through film holes attached at least at a portion where the plurality of porous sound absorbing members are attached, and
   wherein, when the plurality of porous sound absorbing members are attached to the film, the sealant layer with the adhesive is absorbed through the plurality of through film holes and thereby attached to the porous sound absorbing member.

2. The pneumatic tire of claim 1,
   wherein the film with the plurality of porous sound absorbing members are attached to the sealant layer in a circumferential direction.

3. The pneumatic tire of claim 1, wherein the plurality of porous sound absorbing members are made of a polypropylene material.

4. The pneumatic tire of claim 3, wherein the film is made of a polypropylene material.

5. The pneumatic tire of claim 1, wherein the plurality of porous sound absorbing members are spaced apart from each other along a circumferential direction of the pneumatic tire.

\* \* \* \* \*